United States Patent Office 3,324,204
Patented June 6, 1967

3,324,204
N-ACYLATED O-PHENYL PHOSPHOR-
AMIDOTHIOATES
Henry Tolkmith, Midland, Mich., assignor to The Dow
Chemical Company, Midland, Mich., a corporation of
Delaware
No Drawing. Filed Jan. 10, 1964, Ser. No. 336,890
6 Claims. (Cl. 260—959)

The present invention is directed to N-acylated O-phenyl phosphoramidothioates and is particularly directed to compounds of the formula

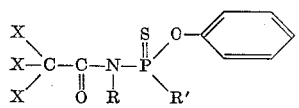

In this and succeeding formulae, R' represents phenoxy or —NHR; each R independently represents hydrogen or lower-alkyl; and each X independently represents bromo, chloro, or fluoro. The expression "loweralkyl" is employed in the present specification and claims to refer to radicals being of from 1 to 4, inclusive, carbon atoms.

These novel compounds are oils or crystalline solid materials which are somewhat soluble in many common organic solvents and of very low solubility in water. The compounds are useful as parasiticides and herbicides and are adapted to be employed for the control of a number of plant, mite, helminth, insect, nematode, bacterial and fungal organisms, such as aphids, beetles, ticks, worms, screwworms, coontail, and millet. The compounds are also useful when employed as agents to inhibit the nitrification of ammonium-nitrogen-containing compounds or reduced nitrogen fertilizers in the soil.

All of the compounds of the present invention except those compounds wherein, simultaneously, R represents hydrogen and R' represents —NH-loweralkyl are prepared by reacting an O-phenyl phosphoramidothioate of the formula

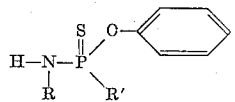

with a trihaloacetyl chloride of the formula

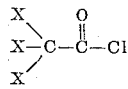

The reaction is carried out in the presence of an acid binding agent, such as an organic tertiary amine, and conveniently in an organic liquid as inert reaction medium. Suitable organic liquids are diethyl ether, benzene, carbon tetrachloride, and methylene chloride.

Some of the product compound is produced when employing the reactants in any amounts. However, the reaction consumes the reactants in amounts which represent equimolecular proportions of reactants and acid binding agent and the use of reactants and acid binding agent in amounts which represent such proportions is preferred. The reaction takes place at temperatures at which hydrogen chloride is evolved, conveniently at temperatures of from —20° to 50° C., with the production of the desired product and chloride of reaction. The chloride appears in the reaction mixture as the chloride salt of the binding agent.

In carrying out the reaction, the reactants and acid binding agent are contacted together in any convenient fashion and maintained for a period of time in the reaction temperature range to complete the reaction. Thus, for example, the trihaloacetyl chloride is contacted with the O-phenyl phosphoramidothioate in the presence of the acid binding agent and in the reaction temperature range. Some product is produced immediately upon the contacting of the reactants; however, higher yields result when the reaction mixture is permitted to stand for a period of time in the reaction temperature range. Following the completion of the reaction, the reaction mixture can be filtered to remove chloride salt of acid binding agent and the reaction medium removed by distillation or evaporation under reduced pressure to obtain the desired product as a residue. This product residue can be purified by conventional procedures, such as washing with water.

The compounds of the present invention wherein R is hydrogen can also be prepared by an alternative procedure. Thus, this alternate procedure prepares those compounds of the present invention wherein, simultaneously, R represents hydrogen and R' represents —NH loweralkyl, which compounds are not readily prepared by the method taught hereinabove. This alternate procedure employs, as starting material, a trihaloacetyl phosphoramidothioic dichloride of the formula

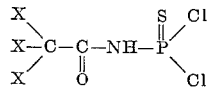

Where R' represents phenoxy, the trihaloacetyl phosphoramidothioic dichloride is reacted with sodium phenoxide. Where R' represents —NHR (amino or monoloweralkylamino), the trihaloacetyl phosphoramidothioic dichloride is reacted successively in either order or simultaneously with sodium phenoxide and a compound of the formula NH₂R. Where the NH₂R compound is employed, that portion of the synthesis is preferably carried out in the presence of an acid binding agent, such as a tertiary amine or an excess of the NH₂R reactant.

Conveniently, the reactions are carried out in an inert liquid reaction medium such as, for example, diethyl ether, benzene, carbon tetrachloride, or methylene chloride. Good results are obtained, where R' represents phenoxy, when employing one molecular proportion of the trihaloacetyl phosphoramidothioic dichloride with two molecular proportions of sodium phenoxide or, where R' represents —NHR, when employing one molecular proportion of the trihaloacetyl phosphoramidothioic dichloride successively in either order or simultaneously with one molecular proportion of sodium phenoxide, and with equimolecular proportions of NH₂R compound, and acid binding agent.

The reaction takes places smoothly at the temperature range of from —20 to 50° C., with the production of the desired product and chloride of reaction. When the acid binding agent is employed in synthesis involving the NH₂R compound as reactant, chloride of reaction appears in the reaction mixture as the chloride salt of the binding agent.

In carrying out the reaction, the reactants and acid binding agent are contacted together in any convenient fashion and maintained for a period of time in the reaction temperature range to complete the reaction. Thus, for example, the trihaloacetyl phosphoramidothioic dichloride is contacted with the sodium phenoxide, or, where R' represents NH₂R, successively in either order with sodium phenoxide and with the NH₂R reactant in the presence of an acid binding agent, such as pyridine or triethylamine. In an alternative procedure, the trihaloacetyl phosphoramidothioic dichloride is contacted with a mixture of sodium phenoxide and NH₂R reactant in the presence of a tertiary amine as acid binding agent. Following the completion of the reaction, the reaction mixture can be filtered and the reaction medium removed by distillation or evaporation under reduced pressure to obtain the desired product as a residue. This product residue can be purified by conventional procedures such as washing with water and recrystallization.

*Example 1.—N-methyl-N-((methylamino)phenoxyphosphinothioyl)-2,2,2-trichloroacetamide*

Trichloroacetyl chloride (18.1 grams; 0.1 mole) was added portionwise and with stirring to 21.6 grams (0.1 mole) or O-phenyl N,N'-dimethylphosphorodiamidothioate dispersed together with 12.0 grams (0.12 mole) of triethylamine in 300 milliliters of benzene. The addition was carried out over a period of about 4 hours and at temperatures of about 20° to 25°. Stirring was thereafter continued for a period of 65 hours to insure completion of the reaction. The mixture was then filtered and the reaction medium removed from the filtrate by vacuum distillation to obtain the N-methyl-N-((methylamino) phenoxyphosphinothioyl) - 2,2,2-trichloroacetamide product as a residue. This product residue was dispersed in cyclohexane and the cyclohexane removed by vacuum distillation. The product is a liquid material having a refractive index $n_D$ 1.5710.

*Example 2.—N-ethyl-N-((ethylamino)phenoxyphosphinothioyl)-2,2,2-trichloroacetamide*

In procedures essentially the same as those employed in Example 1, N-ethyl-N-((ethylamino)phenoxyphosphinothioyl)-2,2,2-trichloroacetamide was prepared by reacting together trichloroacetyl chloride with O-phenyl N,N'-diethylphosphorodiamidothioate. The product has a molecular weight of 389.7 and is a dark oil.

In procedures essentially the same as the foregoing, other products representative of the present invention are prepared as follows:

From N-(dichlorophosphinothioyl)-2,2,2-trichloroacetamide, sodium phenoxide, and n-butylamino, N-((butylamino)phenoxyphosphinothioyl) - 2,2,2 - trichloroacetamide product having a molecular weight of 389.7.

From trichloroacetyl chloride and O,O-diphenyl methylphosphoramidothioate, N - methyl - N-(diphenoxyphosphinothioyl)-2,2,2-trichloroacetamide product having a molecular weight of 424.7.

From trichloroacetyl chloride and O-phenyl N,N'-diisopropylphosphorodiamidothioate, N - isopropyl-N-((isopropylamino)phenoxyphosphinothioyl) - 2,2,2 - trichloroacetamide product as a dark oil.

From trichloroacetyl chloride and O-phenyl N,N'-di-sec-butylphosphorodiamidothioate, N - sec-butyl-N-((sec-butylamino)phenoxyphosphinothioyl) - 2,2,2 - trichloroacetamide product having a molecular weight of 445.8.

From trichloroacetyl chloride and O,O-diphenyl-n-propylphosphoramidothioate, N - (diphenoxyphosphinothioyl)-N-n-propyl-2,2,2-trichloroacetamide product having a molecular weight of 452.7.

From N-(dichlorophosphinothioyl)-2,2,2-trichloroacetamide, sodium phenoxide, and ammonia, N-(aminophenoxyphosphinothioyl) - 2,2,2 - trichloroacetamide product having a molecular weight of 323.6.

From N-(dichlorophosphinothioyl)-2,2,2-trichloroacetamide and sodium phenoxide, N-diphenoxyphosphinothioyl)-2,2,2-trichloroacetamide product having a density, measured at 25° C., which is 1.4801 times as great as the density of water at 4° C.

From trifluoroacetyl chloride and O,O-diphenyl methylphosphoramidothioate, N - methyl - N - (diphenoxyphosphinothioyl)-2,2,2-trifluoroacetamide product having a molecular weight of 375.3.

From tribromoacetyl chloride and O-phenyl N,N'-di-n-butylphosphorodiamidothioate, N-n-butyl-N((n-butylamino)phenoxyphosphinothioyl) - 2,2,2 - tribromoacetamide product having a molecular weight of 579.3.

From N-(dichlorophosphinothioyl)-2,2,2-trichloroacetamide, sodium phenoxide, and methylamino, N-((methylamino)phenoxyphosphinothioyl) - 2,2,2 - trichloroacetamide as a dark oil.

From O,O-diphenyl phosphoramidothioate and trifluoroacetyl chloride, N-(diphenoxyphosphinothioyl)-2,2,2-trifluoroacetamide product having a molecular weight of 361.3.

From N - (dichlorophosphinothioyl) - 2,2 - dibromo-2-chloroacetamide, sodium phenoxide, and methylamine, N-((methylamino)phenoxyphosphinothioyl) - 2,2-dibromo-2-chloroacetamide product having a molecular weight of 436.5.

From O,O-diphenyl methylphosphoramidothioate and dichlorofluoroacetyl chloride, N - (diphenoxyphosphinothioyl)-N-methyl-2,2-dichloro-2-fluoroacetamide product having a molecular weight of 408.2.

From O-phenyl N,N' - diisopropylphosphorodiamidothioate and chlorodifluoroacetyl chloride, N-((isopropylamino)phenoxyphosphinothioyl) - N-isopropyl-2-chloro-2,2-difluoroacetamide product having a molecular weight of 384.8.

When the compounds of the present invention are employed as parasiticides and herbicides, the compounds can be dispersed on a finely divided solid such as chalk to talc or a finely divided solid surface active dispersing agent and the resulting products employed as dusts. Such mixtures can also be dispersed in water and employed as sprays. In other procedures, the products can be employed as active constituents in solvent solutions, water-in-oil or oil-in-water emulsions or aqueous dispersions.

In representative operations, each of N-methyl-N-((methylamino)phenoxyphosphinothioyl) - 2,2,2-trichloroacetamide and N-ethyl-N-((ethylamino)phenoxyphosphinothioyl)-2,2,2-trichloroacetamide was dispersed, in separate operations, in a separate larval suspension of root knot nematode (*Meloidogyne spp.*) to prepare a culture medium containing 10 parts of test compound per one million parts by weight of ultimate composition. Each of the culture media was incubated for about six days and then inspected. It was found that there was obtained in each culture media a 100 percent kill and control of root-knot nematode.

The phosphoramidothioic dichloride compound employed as the starting material in accordance with the alternative procedure for preparation of the present compounds is itself prepared in known procedures, wherein an appropriate 2,2,2-trihaloacetamide is reacted with phosphorus pentachloride ($PCl_5$) to produce a trihaloacetyl phosphoramidic trichloride intermediate having the formula

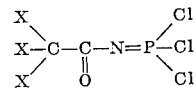

The reaction takes place smoothly at temperatures of from 40° to 70° C., and conveniently, in an organic liquid as inert reaction medium. Upon completion of the reaction, the intermediate material is separated by conventional procedures and thereafter treated with thioacetic acid to produce the desired trihaloacetyl phosphoramidothioic dichloride starting material.

The O-phenyl phosphoramidothioate starting material is prepared in known procedures which comprise the reaction of phosphorothioic chloride ($Cl_3P=S$) successively in either order with sodium phenoxide and with a reactant of the formula $NH_2R$. That portion of the synthesis which employs sodium phenoxide is conveniently carried out at temperatures of −20° to 80° C. That portion of the synthesis which employs the $NH_2R$ reactant is preferably conducted in the presence of a hydrogen halide acceptor, such as a tertiary amine, and at temperatures at which hydrogen halide of reaction is evolved, conveniently at temperatures of from −20° to 30° C. Conveniently, the reactions are conducted in the presence of an organic liquid as inert liquid reaction medium, such as benzene or toluene. Where R' represents phenoxy, it is preferred to employ one molecular proportion of each of phosphorothioic chloride, $NH_2R$ reactant, and hydrogen halide acceptor, and two molecular proportions of sodium phenoxide. Where R' represents —NHR, it is preferred to employ one molecular proportion of each of phosphorothioic chloride and sodium phenoxide, and two molecular proportions of NH₂R reactant and two molecular proportions of hydrogen halide acceptor.

I claim:
1. The compound of the formula

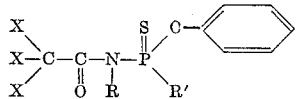

wherein R' represents a member selected from the group consisting of phenoxy and —NHR; each R independently represents a member selected from the group consisting of hydrogen and loweralkyl; and each X independently represents a member selected from the group consisting of bromo, chloro, and fluoro.

2. N-(diphenoxyphosphinothioyl)-2,2,2-trichloroacetamide.
3. N-((methylamino)phenoxyphosphinothioyl)-2,2,2-trichloroacetamide.
4. N-methyl-N-((methylamino)phenoxyphosphinothioyl)-2,2,2-trichloroacetamide.
5. N-ethyl-N-((ethylamino)phenoxyphosphinothioyl)-2,2,2-trichloroacetamide.
6. N-isopropyl-N-(isopropylamino phenoxyphosphinothioyl)-2,2,2-trichloroacetamide.

No references cited.

CHARLES B. PARKER, *Primary Examiner.*

A. H. SUTTO, *Assistant Examiner.*